(12) United States Patent
Krawczyk

(10) Patent No.: US 11,307,371 B2
(45) Date of Patent: Apr. 19, 2022

(54) ARMORED DATA CABLE ASSEMBLY

(71) Applicant: Roman Krawczyk, Lindenhurst, NY (US)

(72) Inventor: Roman Krawczyk, Lindenhurst, NY (US)

(*) Notice: Subject to any disclaimer, the term of this patent is extended or adjusted under 35 U.S.C. 154(b) by 0 days.

(21) Appl. No.: 17/012,431

(22) Filed: Sep. 4, 2020

(65) Prior Publication Data

US 2021/0063666 A1 Mar. 4, 2021

Related U.S. Application Data

(60) Provisional application No. 62/895,656, filed on Sep. 4, 2019.

(51) Int. Cl.
*G02B 6/44* (2006.01)

(52) U.S. Cl.
CPC ......... *G02B 6/4433* (2013.01); *G02B 6/4415* (2013.01); *G02B 6/4434* (2013.01); *G02B 6/4435* (2013.01)

(58) Field of Classification Search
CPC .............................. H01B 11/22; G02B 6/4433
See application file for complete search history.

(56) References Cited

U.S. PATENT DOCUMENTS

| | | | |
|---|---|---|---|
| 1,687,013 A | 10/1928 | Frederickson | |
| 1,995,407 A | 3/1935 | Walker | |
| 2,234,675 A | 3/1941 | Johnson | |
| 2,909,336 A | 10/1959 | Short | |
| 3,430,337 A | 3/1969 | Kelly | |
| 3,530,661 A | 9/1970 | Thomen | |
| 3,634,607 A | 1/1972 | Coleman | |
| 4,028,660 A * | 6/1977 | Pitts, Jr. | E21B 47/12 340/854.9 |
| 4,522,464 A | 6/1985 | Thompson et al. | |
| 4,609,416 A | 9/1986 | Himmelberger et al. | |
| 4,696,542 A | 9/1987 | Thompson | |
| 5,054,868 A | 10/1991 | Hoban et al. | |
| 5,077,526 A * | 12/1991 | Vokey | G01R 31/58 324/541 |
| 5,329,605 A | 7/1994 | Wargotz | |
| 7,184,364 B2 | 2/2007 | Sawin et al. | |

(Continued)

FOREIGN PATENT DOCUMENTS

| | | |
|---|---|---|
| CN | 1088350 A | 6/1994 |
| CN | 101359819 A | 2/2009 |

(Continued)

OTHER PUBLICATIONS

International Search Report and Written Opinion for Application No. PCT/US2020/049346 dated Jan. 8, 2021.

(Continued)

*Primary Examiner* — Charlie Y Peng
(74) *Attorney, Agent, or Firm* — Carter, DeLuca & Farrell LLP; George Likourezos; Bradley J. Shelowitz

(57) ABSTRACT

A data cable assembly includes at least one pair of conductors twisted about one another, optionally disposed along an outer surface of a pair separator. The conductors are covered by an inner jacket, and an armor disposed on the outer surface of the inner jacket. The inner jacket is covered by an outer jacket with a rip cord disposed between the armor and the outer jacket.

24 Claims, 1 Drawing Sheet

(56) References Cited

U.S. PATENT DOCUMENTS

| | | | |
|---|---|---|---|
| 7,284,994 B2 | 10/2007 | Kowalczyk | |
| 7,536,072 B2 | 5/2009 | Craig et al. | |
| 8,347,533 B2 | 1/2013 | Hardin et al. | |
| 8,369,668 B1* | 2/2013 | McNutt | G02B 6/4479 385/109 |
| 8,452,142 B1 | 5/2013 | Laws et al. | |
| 8,639,075 B1 | 1/2014 | Burnett | |
| 8,724,947 B2 | 5/2014 | Bohler et al. | |
| 8,946,549 B2 | 2/2015 | Picard et al. | |
| 9,046,669 B2 | 6/2015 | Murphy et al. | |
| 9,070,308 B2 | 6/2015 | Hardin et al. | |
| 9,182,562 B2 | 11/2015 | Peterson, III et al. | |
| 9,396,838 B2 | 7/2016 | Kummer et al. | |
| 9,496,075 B2 | 11/2016 | Varkey et al. | |
| 9,576,702 B2 | 2/2017 | Wobick et al. | |
| 9,720,198 B2 | 8/2017 | Kuffel et al. | |
| 10,026,522 B1* | 7/2018 | Gebs | H01B 3/441 |
| 10,249,410 B1 | 4/2019 | Lanoe et al. | |
| 10,276,280 B1 | 4/2019 | Lewis, Sr. | |
| 2003/0055671 A1 | 3/2003 | Nassar | |
| 2003/0082380 A1* | 5/2003 | Hager | G02B 6/4432 428/297.4 |
| 2006/0124344 A1 | 6/2006 | Clark et al. | |
| 2007/0044991 A1 | 3/2007 | Varkey | |
| 2010/0061685 A1 | 3/2010 | Kowalczyk et al. | |
| 2013/0108226 A1 | 5/2013 | Gimblet et al. | |
| 2013/0202262 A1* | 8/2013 | Haymore | G02B 6/4494 385/111 |
| 2013/0236148 A1 | 9/2013 | Bohler et al. | |
| 2016/0329128 A1 | 11/2016 | Varkey et al. | |
| 2016/0358693 A1 | 12/2016 | Wang et al. | |
| 2017/0221603 A1 | 8/2017 | Pourladian et al. | |
| 2018/0358794 A1 | 12/2018 | Parke | |
| 2021/0263256 A1* | 8/2021 | Blazer | G02B 6/4486 |

FOREIGN PATENT DOCUMENTS

| | | | |
|---|---|---|---|
| CN | 102998756 A | | 3/2013 |
| CN | 203192498 U | | 9/2013 |
| CN | 203645287 U | | 6/2014 |
| CN | 204010845 U | | 12/2014 |
| CN | 106024192 A | * | 10/2016 |
| EP | 0595535 A1 | | 5/1994 |
| WO | 2008154116 A1 | | 12/2008 |
| WO | 2015057860 A1 | | 4/2015 |

OTHER PUBLICATIONS

International Preliminary Report on Patentability issued in corresponding International Application No. PCT/US2020/049346 dated Aug. 12, 2021, 7 pages.

* cited by examiner

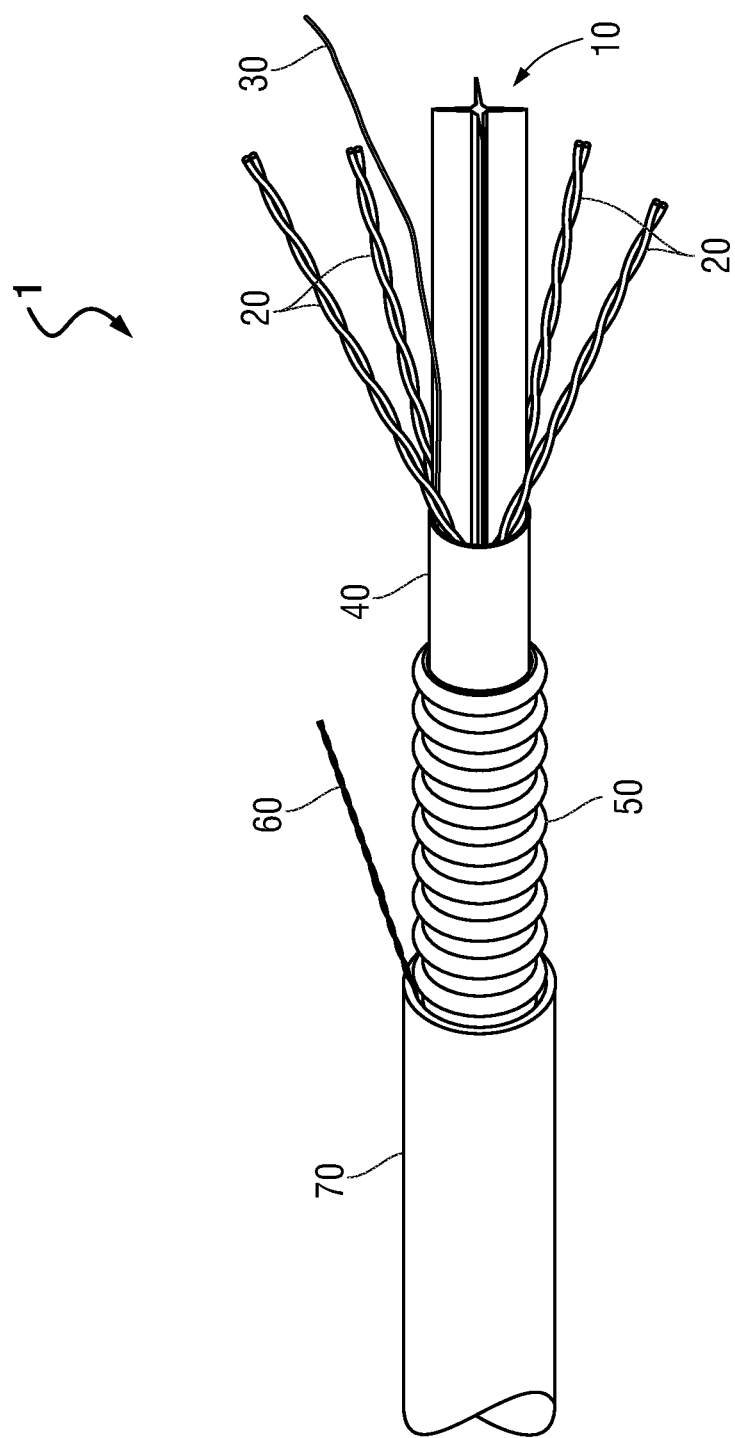

ARMORED DATA CABLE ASSEMBLY

CROSS-REFERENCE TO RELATED APPLICATION

This application claims the benefit of, and priority to, U.S. Provisional Patent Application No. 62/895,656, filed on Sep. 4, 2019, the entire contents of which are hereby incorporated herein by reference.

FIELD

The disclosure relates to a data cable assembly including an iron-based steel armor for increased protection of the data cable assembly.

BACKGROUND

Data cables are generally used to carry Ethernet, data, power, and other signals such as telephonic or video signals. The construction of a data cable assembly has been geared toward preserving the performance of the conductors when deployed in various industries and homes while maintaining official standards. Traditionally, data cables are constructed with an outer jacket to protect against different damaging environmental elements. These jackets often do not provide the sort of protection necessary to support the ever-growing widespread use of data cables throughout all industries and homes, while maintaining non-interrupted high-speed connections.

SUMMARY

The present disclosure provides a data cable assembly including at least one pair of conductors, an inner jacket, an armor, an outer jacket, and a rip cord. The at least one pair of conductors are twisted about one another. The inner jacket covers the twisted conductors. The armor is disposed on the outer surface of the inner jacket. The rip cord is disposed between the armor and the outer jacket.

In aspects, the at least one pair of the conductors twisted about one another may include a first pair of twisted conductors and a second pair of twisted conductors. The data cable assembly may further include a pair separator defining first and second channels, wherein the first pair of twisted conductors and the second pair of twisted conductors are disposed along the at least first and second channels of the pair separator, respectively.

In aspects, the inner jacket may be configured to cover the twisted conductors and the pair separator.

In aspects, the outer jacket may be fabricated from one of PVC, plenum, or LSZH.

In aspects, the inner jacket may be fabricated from metallic material.

In aspects, the inner jacket may be fabricated from non-metallic material.

In aspects, the data cable assembly may further include a drain wire configured to reduce a resistance from any point to ground and disposed along the surface of the pair separator alongside at least one of the first or second pair of twisted conductors.

In aspects, the armor may be configured to transfer data or voltage.

In aspects, the armor may include an overcoat or an undercoat.

In aspects, the armor may be configured to provide a ground for the data cable assembly.

In aspects, the overcoat or undercoat may protect the twisted conductors against environmental harms, chemical harms, or extreme temperature.

In aspects, the overcoat or undercoat and the inner jacket may serve as a pair of conductors for data or power transmission.

In one aspect, the present disclosure provides a data cable assembly including a first pair of twisted conductors, a second pair of twisted conductors, an inner jacket, a pair separator, and an armor. The inner jacket covers the first pair of twisted conductors and the second pair of twisted conductors. The pair separator defines first and second channels. The first pair of twisted conductors and the second pair of twisted conductors is disposed along the first channel of the pair separator and the second pair of twisted conductors are disposed along the second channel of the pair separator. The armor is disposed on an outer surface of the inner jacket.

In aspects, the data cable assembly may further include an outer jacket and a rip cord. The rip cord may be disposed between the armor and the outer jacket.

In aspects, the inner jacket may be configured to cover the first and second pairs of twisted conductors and the pair separator.

In aspects, the outer jacket may be fabricated from one of PVC, plenum, or LSZH.

In aspects, the inner jacket may be fabricated from metallic material.

In aspects, the inner jacket may be fabricated from non-metallic material.

In aspects, the data cable assembly may further include a drain wire configured to reduce a resistance from any point to ground and disposed along the surface of the pair separator alongside the first and second pairs of twisted conductors.

In aspects, the armor may be configured to transfer data or voltage.

In aspects, the armor may include an overcoat or an undercoat.

In aspects, the armor may be configured to provide a ground for the data cable assembly.

In aspects, the overcoat or undercoat may protect the first and second pairs of twisted conductors against environmental harms, chemical harms, or extreme temperature.

In aspects, the overcoat or undercoat and the inner jacket may serve as a pair of conductors for data or power transmission.

BRIEF DESCRIPTION OF THE DRAWING

The above aspects, features, and advantages of the present disclosure will become more apparent in light of the following detailed description when taken in conjunction with the accompanying drawing, in which:

FIG. 1 is a perspective view of an armored data cable assembly according to the disclosure.

DETAILED DESCRIPTION

Particular embodiments of the disclosure are described hereinbelow with reference to the accompanying drawing. As used herein, the term "data cable assembly" refers to network cable assembly or other cable assemblies. Aspects of the armored data cable assembly disclosed herein include structural features for protection of the data cable assembly which provide benefits to the performance of the data cable assembly due to relative effects between the different layers. In the following description, well-known functions, or construction are not described in detail to avoid obscuring the disclosure in unnecessary detail.

Although the following disclosure describes an armored data cable assembly as being used with at least one pair of conductors, it is understood that the benefits of the structural features of all of the aspects of the armored data cable assembly disclosed herein may be realized by various types of conductors or cables used to transfer data from one point to another, and the following disclosure is not intended to be limiting.

FIG. 1 illustrates an armored data cable assembly according to the disclosure and shown generally as a data cable assembly 1. The data cable assembly 1 generally includes a drain wire 30, an inner jacket or shield 40, an armor 50, a rip cord 60, and an outer jacket 70. The data cable assembly 1 has one or more conductors 20 for transferring data from one point to another. The one or more conductors 20 may be fabricated from highly conducive elements, such as, for example copper. Other types of conductors may also be utilized, such as, for example, copper, aluminum, gold, and silver, and iron. Glass with a conductive coating, or conductive glass, and conductive polymers, or more precisely, intrinsically conducting polymers (ICPs), can also be used for fabricating the conductors 20. The one or more conductors 20 may be twisted to one another in pairs and configured to enable transmission from one end to another.

The data cable assembly 1 may further include a pair separator 10. The one or more conductors 20 twisted into pairs may be disposed in the outer surface of the pair separator 10. The pair separator 10 is configured to prevent the one or more conductors 20 twisted into pairs from coming in contact with one another. Thus, the pair separator 10 ensures there is no cross-talk between the twisted pair of the one or more conductors 20 and another twisted pair of the one or more conductors 20 to compromise or affect the integrity of the data being transmitted. Based on the number of twisted pairs created from the one or more conductors 20, the pair separator 10 is configured to have one or more defined channels to support the twisted pairs. For example, the data cable assembly 1 may have 8 conductors, twisted into 4 pairs and disposed on the outer surface of a pair separator 10 having 4 defined channels to support the 4 twisted pairs. The drain wire 30 is disposed along the surface of the pair separator 10 alongside the one or more conductors 20. The drain wire 30 is configured to reduce the resistance from any point to ground. The drain wire 30, for example, carries extraneous electrical noise to ground and away from the circuit or system.

Surrounding the one or more twisted conductors 20, or alternatively, the pair separator 10 and the drain wire 30, is the shield 40. The shield 40 is configured to protect the signals on the cable assembly 1 from external interference. The shield 40 may be fabricated from metallic or non-metallic conductive material(s). The shield 40, fabricated from metallic material, may also serve as a path to ground in tandem with the drain wire 30, which makes electrical contact with the shield 40. The shield 40 provides an electrically conductive barrier to attenuate electromagnetic waves external to the shield 40 and provides a conduction path by which induced currents can be circulated and returned to the source via the drain wire 30. The shield 40 may also be coated with various compounds to ensure protections as per required specifications. For example, compounds such as high strength thermoplastic material (e.g., polyvinyl chloride) or lightweight, durable thermoplastic material with variable crystalline structure (e.g., polyethylene). The shield 40 may have a thickness approximately 0.05 mm to about 0.30 mm.

Surrounding the one or more twisted conductors 20, or alternatively, the pair separator 10, the drain wire 30, and the shield 40, is the armor 50. The armor 50 is a tube formed of stainless steel. The armor 50 is configured to provide a substantially smaller bend radius than an interlocked steel tube, increased crush protection, higher axial strength, and corrosion resistance. The armor 50 may be a spiral tube having a gap between each spiraling ring. For example, the gap can be approximately 0.03 mm to about 1.00 mm with an outside diameter of approximately 1.20 mm to about 9.25 mm, a thickness of approximately 0.20 mm to about 1.00 mm and an inner diameter of approximately 0.50 mm to about 8.25 mm. The armor 50 may have a crush resistance of approximately 100 KGf/100 mm.

Additionally, the armor 50 may include multiple layers to increase strength of an overcoat or undercoat, the overcoat or undercoat may have for example a System Usability Scale (SUS) rating of SUS202, SUS 204, or SUS304. The coating of the armor 50 may act as a defense against environmental, certain chemical harms, or protect from extreme temperatures. The armor 50 is conductive in nature and may be configured to serve as ground, conduct data, or as a power voltage. The armor 50 is configured to operate in conjunction with the shield 40 to serve as a pair of conductors for data or power transmission via the coating of the armor 50.

The outer jacket 70 is disposed on the outermost layer of the data cable assembly 1. The outer jacket 70 acts as a first line of defense against moisture, mechanical, flame and chemical harm for the data cable assembly 1. In particular, the outer jacket 70 provides protection for the shield 40, the armor 50, and one or more conductors 20 within the cable assembly 1, such as, for example protections from mechanical damage during and after installation, moisture, chemical, UV and other known elements that deteriorate the quality and operation of the conductor. The outer jacket 70 may be fabricated from PVC, plenum, Low Smoke Zero Halogen (LSZH), or a custom polymer. The outer jacket 70 may be formed from any suitable material contemplated to provide protection. The outer jacket 70 may have a thickness in the range of approximately 0.20 mm to about 2.0 mm. Additionally, and/or alternatively, the outer jacket 70 may vary in color, such as, for example yellow, orange, aqua, or blue.

The rip cord 60 is disposed between the outer jacket 70 and the armor 50. The rip cord is configured to cut back the outer jacket 70 to expose reaming portions of the data cable assembly 1 and prevent the risk of damaging the reaming portions of the data cable assembly 1.

Any or all portions of any of the data cable assembly disclosed herein may be structured in any suitable manner, e.g., material and design.

From the foregoing and with reference to the drawing, those skilled in the art will appreciate that certain modifications can be made to the present disclosure without departing from the scope of the same.

While an illustrative embodiment described by the disclosure is shown in the drawing, it is not intended that the disclosure be limited to only that embodiment, as it is intended that the disclosure be as broad in scope as the art will allow and that the specification be read likewise. Therefore, the above description should not be construed as limiting, but merely as exemplifications of the embodiment shown by the drawing.

What is claimed is:

1. A data cable assembly comprising:
   a pair separator defining at least one channel;

at least one pair of conductors twisted about one another and received in the at least one channel of the pair separator;

an inner jacket covering the pair separator and the twisted conductors, the inner jacket being fabricated from metallic material;

an armor disposed on an outer surface of the inner jacket;

an outer jacket disposed about the armor; and a rip cord, wherein the rip cord is disposed between the armor and the outer jacket.

2. The data cable assembly according to claim 1, wherein the at least one pair of the conductors twisted about one another includes a first pair of twisted conductors and a second pair of twisted conductors, the at least one channel of the pair separator defining first and second channels, wherein the first pair of twisted conductors and the second pair of twisted conductors are disposed along the first and second channels of the pair separator, respectively.

3. The data cable assembly according to claim 1, wherein the outer jacket is fabricated from at least one of PVC, plenum, or LSZH.

4. The data cable assembly according to claim 2, further comprising a drain wire configured to reduce a resistance from any point to ground and disposed along the surface of the pair separator alongside at least one of the first or second pair of twisted conductors.

5. The data cable assembly according to claim 1, wherein the armor is configured to transfer data or voltage.

6. The data cable assembly according to claim 1, wherein the armor includes an overcoat or an undercoat and has a crush resistance of at least about 100KGf/100 mm.

7. The data cable assembly according to claim 1, wherein the armor is configured to provide a ground for the data cable assembly.

8. The data cable assembly according to claim 6, wherein the overcoat or undercoat protects the twisted conductors against environmental harms, chemical harms, or extreme temperature.

9. The data cable assembly, according to claim 6, wherein the overcoat or undercoat and the inner jacket serve as a pair of conductors for data or power transmission.

10. A data cable assembly comprising:
a first pair of twisted conductors;
a second pair of twisted conductors;
an inner jacket covering the first and second pairs of twisted conductors, the inner jacket being fabricated from metallic material;
a pair separator defining first and second channels, wherein the first pair of twisted conductors is disposed along the first channel of the pair separator and the second pair of twisted conductors are disposed along the second channel of the pair separator, wherein the inner jacket is disposed about the pair separator;
an armor disposed on an outer surface of the inner jacket; and
an outer jacket disposed about the armor.

11. The data cable assembly according to claim 10, further comprising a rip cord, wherein the rip cord is disposed between the armor and the outer jacket.

12. The data cable assembly according to claim 11, wherein the outer jacket is fabricated from at least one of PVC, plenum, or LSZH.

13. The data cable assembly according to claim 10, wherein the armor is fabricated from steel and includes a plurality of rings spaced from one another along a length of the armor.

14. The data cable assembly according to claim 10, further comprising a drain wire configured to reduce a resistance from any point to ground and disposed along the surface of the pair separator alongside the first and second pairs of twisted conductors.

15. The data cable assembly according to claim 10, wherein the armor is configured to transfer data or voltage.

16. The data cable assembly according to claim 10, wherein the armor includes an overcoat or an undercoat.

17. The data cable assembly according to claim 10, wherein the armor is configured to provide a ground for the data cable assembly.

18. The data cable assembly according to claim 16, wherein the overcoat or undercoat protects the first and second pairs of twisted conductors against environmental harms, chemical harms, or extreme temperature.

19. The data cable assembly, according to claim 16, wherein the overcoat or undercoat and the inner jacket serve as a pair of conductors for data or power transmission.

20. A data cable assembly comprising:
a pair separator defining at least one channel;
at least one pair of conductors twisted about one another and received in the at least one channel of the pair separator;
an inner jacket covering the pair separator and the at least one pair of conductors twisted about another;
an armor disposed on an outer surface of the inner jacket, the armor including an overcoat or an undercoat, the overcoat or the undercoat and the inner jacket serving as a pair of conductors for data or power transmission;
an outer jacket disposed about the armor; and
a rip cord disposed between the armor and the outer jacket.

21. The data cable assembly of claim 20, wherein the at least one pair of the conductors twisted about one another includes a first pair of twisted conductors and a second pair of twisted conductors, the at least one channel of the pair separator defining first and second channels, wherein the first pair of twisted conductors and the second pair of twisted conductors are disposed along the first and second channels of the pair separator, respectively.

22. The data cable assembly of claim 20, further comprising a drain wire configured to reduce a resistance from any point to ground and disposed along the surface of the pair separator alongside the at least one pair of twisted conductors.

23. The data cable assembly of claim 20, wherein the armor is configured to provide a ground for the data cable assembly.

24. The data cable assembly of claim 20, wherein the undercoat or the overcoat has a crush resistance of at least about 100KGf/100 mm.

* * * * *